United States Patent [19]

Guarnieri et al.

[11] 3,930,241

[45] Dec. 30, 1975

[54] TAILORED ANISOTROPY MAGNETIC BUBBLE DOMAIN MATERIAL

[75] Inventors: C. Richard Guarnieri, San Jose; Kenneth Lee; Aare Onton, both of Saratoga, all of Calif.

[73] Assignee: International Business Machines Corporation, Armonk, N.Y.

[22] Filed: Oct. 29, 1974

[21] Appl. No.: 518,329

[52] U.S. Cl. .......... 340/174 TF
[51] Int. Cl.² .......... G11C 11/14
[58] Field of Search .......... 340/174 TF

*Primary Examiner*—James W. Moffitt
*Attorney, Agent, or Firm*—Joseph E. Kieninger

[57] ABSTRACT

A film of magnetic amorphous material capable of supporting bubble domains containing a region therein having a canted direction of magnetic uniaxial anisotropy is described. An example is a magnetic amorphous film having bubble domains therein in which the magnetic uniaxial anisotropy is canted at an angle of 5° from a line perpendicular to the plane of the film. Another example is a film of magnetic amorphous material containing one layer having the magnetic uniaxial anisotropy canted in one direction and a second layer having the magnetic uniaxial anisotropy canted in another direction.

10 Claims, 6 Drawing Figures

TAILORED ANISOTROPY MAGNETIC BUBBLE DOMAIN MATERIAL

FIELD OF THE INVENTION

This invention relates to bubble domains in magnetic amorphous materials and more particularly to amorphous materials having the magnetic uniaxial anisotropy in a canted direction.

DESCRIPTION OF THE PRIOR ART

Amorphous materials for magnetic bubble domain devices are described in co-pending U.S. Pat. application, Ser. No. 284,513, filed on Aug. 29, 1972 and now abandoned and assigned to the assignee of the present invention. The aforementioned application is incorporated herewith by reference thereto. As described therein, the amorphous magnetic compositions can be prepared in either a thin film, in the bulk form or as particles in a binder. The anisotropy can be either parallel to the plane of the film of this material or perpendicular to the film plane. The amorphous material is comprised of a single element or as a multi-component system in which the properties can be altered by varying the composition. Binary and ternary compositions, either alloys or compounds, are suitable. Examples of suitable compositions are gadolinium cobalt and holmium cobalt. The magnetic properties of these substantially amorphous compositions can be changed during fabrication by altering the fabrication process or the composition range of the constituents.

While there are a number of advantages of using amorphous magnetic materials in place of the commonly used garnet materials for bubble domain device applications, there are also disadvantages in using amorphous films. The primary problem presently encountered with amorphous magnetic materials is that the coercivity of the amorphous materials is higher than that of the crystalline garnet materials. The higher coercivity of the amorphous materials makes the obligation or translation of bubble domains through amorphous materials more difficult than in the preferred garnet material.

SUMMARY OF THE INVENTION

It is an object of this invention to provide an improved bubble domain system.

It is another object of this invention to provide an improved bubble domain material.

It is yet another object of this invention to provide an improved magnetic amorphous material suitable for supporting bubble domains.

It is yet another object of this invention to provide an amorphous magnetic film having improved propagation properties.

It is yet still another object of this invention to provide a method of custom tailoring the properties of magnetic amorphous materials.

It is yet still another object of this invention to provide a method of varying the uniaxial anisotropy of magnetic amorphous materials.

These and other objects are accomplished by a film of magnetic amorphous material having a magnetic uniaxial anisotropy canted from the perpendicular to the plane of the film. For example, the amorphous material can have its magnetic uniaxial anisotropy canted at an angle of 5° from the perpendicular to the plane of the film. The magnetic uniaxial anisotropy of the film is canted in this invention in contrast to being perpendicular or parallel to the plane of the film as described in the prior art. Another embodiment of this invention is to have a plurality of regions in the amorphous film in which these regions have different angles of canting therein or variations of the magnitude of the anisotropy. Another embodiment includes a film having a plurality of layers of amorphous material in which the layers have different directions of canting of anisotropy.

Other objects of this invention will be apparent from the following detailed description, reference being made to the accompanying drawings wherein various embodiments of the present invention are clearly shown.

DESCRIPTION OF THE ILLUSTRATED EMBODIMENTS

In general, this invention describes a magnetic amorphous material capable of supporting bubble domains which has a region therein having a canted direction of magnetic uniaxial anisotropy. While bubble domains are commonly cylindrical type entities, in this invention they would include those entities as well as bubble domain geometries which are formed as the result of the canting of the anisotropy. The physical properties affecting the movement of bubble domains in the amorphous material is affected by the canted direction of magnetic uniaxial anisotropy. This invention provides a method of tailoring the physical properties of the amorphous magnetic material to make it more suitable for use in bubble domain devices.

One useful feature of this invention is that regions of canted material could serve as elements of the bubble domain device that perform specific useful functions. For example, regions that are slightly canted could serve as channels through which bubble domains are propagated. The direction of bubble domain propagation can be predictable when slight canting is employed in channel regions. Another example is that regions that are more canted, 30° to 90°, for instance, tend to repel bubble domains and as a result can be used as dams or confining regions to guide bubble domains along paths of uncanted or slightly canted amorphous material.

Another useful feature of this invention is that canted anisotropy material offers a way of propagating bubbles not otherwise realizeable in perpendicular anisotropy material. For example, a bubble with two Bloch lines would have them at opposite ends of the bubble along the projection of the canting direction in the plane of the film. Then the bubble domain walls at the ends of the bubble with the Bloch lines would be affected unequally by an applied magnetic field perpendicular to the film plane. The result would be a motion of the bubble along the direction of the projection of the canting in the plane of the film. If the canting varies in the material, then propagation will vary. Thus, adjacent rows of bubbles can be made to move in opposite directions with the same applied field pulse if the direction of the canting is opposite. Reversal of the sense of the applied field pulse will make the bubbles back up. This alternative means of propagation is especially important for amorphous magnetic material because they tend to have higher coercivity than the crystalline garnet materials. Thus, propagation with applied in-plane magnetic field gradients is difficult compared with the case in garnets.

A third useful feature of canted material, because of the property that canting tends to align Bloch lines along the direction of the canting, is the use of appropriately canted material in bubble propagation paths to select between bubbles with various numbers of Bloch lines.

Figure 1:
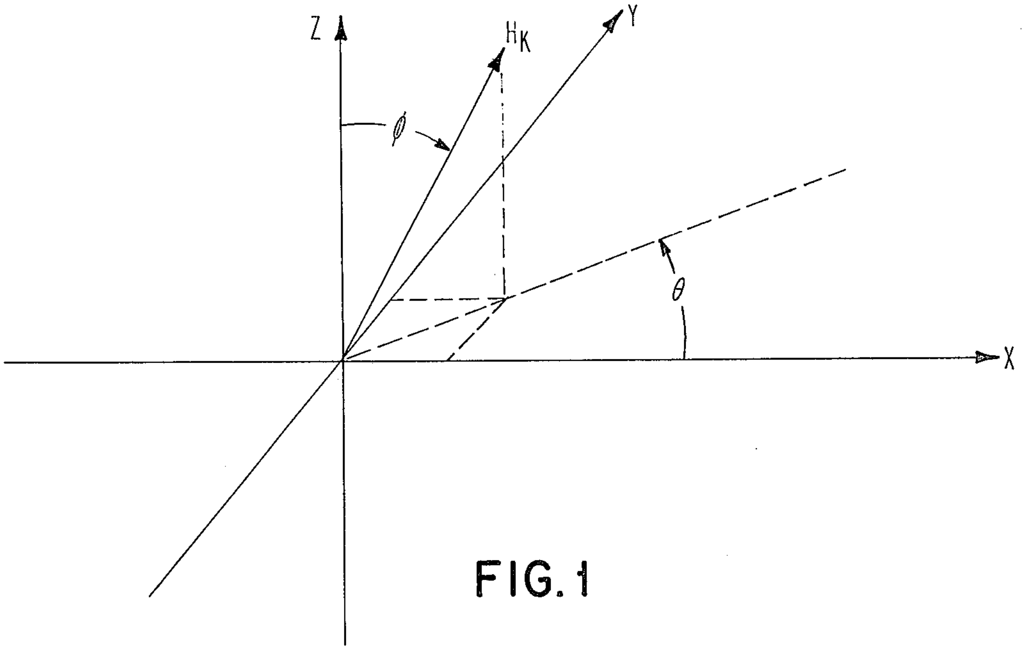
FIG. 1 is a geometric system for illustrating the measurement of the canting of the uniaxial anisotropy.

FIG. 1 sets forth a coordinate system for defining the subsequent angle of canting $\phi$ and the direction of canting $\theta$ of the magnetic uniaxial anisotropy of the amorphous materials. The canting direction is defined by the angles $\phi$ and $\theta$, where $\phi$ is between 0° and 90° and defines the angle of canting measured from the perpendicular to the plane of the film, and where $\theta$ is from 0° to 360° and defines the angle of orientation of the projection of the canting in the plane of the film as measured from an arbitrary line, for example, $x$. $H_k$ is the direction of the anisotropy of the material.

Figure 2:
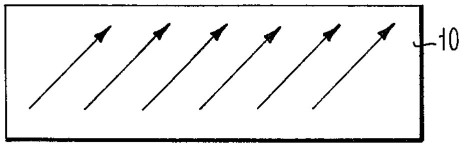
FIG. 2 is a cross-sectional view showing canting in one direction.

As shown in FIG. 2, the canting of the uniaxial magnetic anisotropy is canted at a direction away from the perpendicular to the film of material. The canting is defined by the angle $\phi$ and is between 0° and 90°. The prior art amorphous materials described in the aforementioned patent application described materials having a magnetic uniaxial anisotropy of either 0° or 90°. The material described in this figure could be produced by evaporation from a source which lies in the approximate direction in which the anisotropy field arrows in the figure are pointing.

Figure 3:
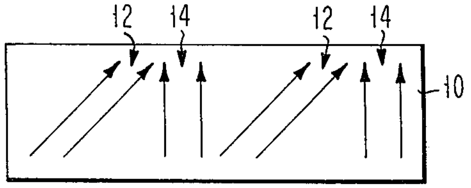
FIG. 3 is a cross-sectional view showing canting and uncanted (normal) anisotropy.

In FIG. 3, the film of magnetic amorphous material contains regions 12 in which the magnetic uniaxial anisotropy is canted at an angle to the plane of the film and regions 14 in which the magnetic uniaxial anisotropy is perpendicular, that is uncanted, to the plane of the film 10. Alternatively, the canted region 12 may have its canting direction out of the plane. The canting arrangement shown here could be interpreted as a cross section of a channeled device in which the regions 14 are regions of bubble existence and the regions 12 are dams which serve to define the channels 14. Bubble propagation would be in a direction normal to the plane of this cross-sectional view. Such a device structure could be fabricated by evaporation from multiple sources through a mask or by alternate evaporation from the same source while the film is tilted or the source is moved to alternately deposit the regions 12 and 14.

Figure 4:
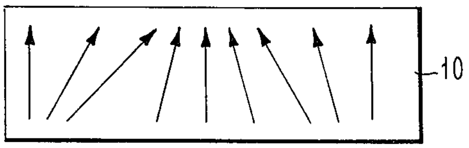
FIG. 4 is a cross-sectional view showing a plurality of canting of various angles.

In FIG. 4, there is a plurality of different canted angles throughout the film 10. While FIG. 4 shows a plurality of canted angles which are all different from each other, it is understood that any variation of canting angles may be employed. Such continuous variations of canting may be useful in a bubble propagation path where it is desired to align Bloch lines in bubble domain walls to selectively direct bbubbles depending on the number of Bloch lines they possess.

Figure 5:
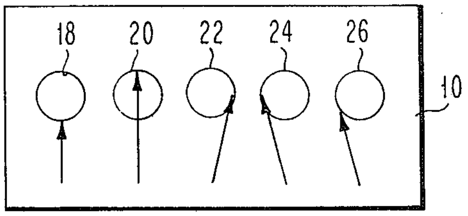
FIG. 5 is a top view showing a plurality of canting in various directions.

In FIG. 5, in the film 10 are bubble domains 18, 20, 22, 24 and 26. The angle of canting of the magnetic uniaxial anisotropy is the same for all 5 of the bubble domain regions in the film 10. The direction of the canting, however, is different and is shown by the arrows, the arrows pointing to the position on a circle which represents the 360° range of the angle, $\theta$. It is understood that the direction of canting is measured by the angle $\theta$ in FIG. 1 and can vary from 0° to 360°. The direction of the canting may be varied or kept constant and at the same time, the angle of canting $\phi$ may be constant or varied. A spiraling structure in the anisotropy would be produced by evaporating at an angle to the substrate so as to produce material with $\phi$ between 0° and 90° and simultaneously rotating the substrate or source about an axis normal to the plane of the film. The resulting film would have an anisotropy that is changing in direction along the thickness of the film. If the repetitive distance of the structure along the thickness of the film is small compared to the domain wall thickness, the net result is a film with reduced perpendicular magnetic anisotropy. If the repetitive distance is comparable to or larger than the domain wall thickness, the spiraling anisotropy will change the domain wall energy and give a chiral sense to it. In the spiral structure described, the regions 18, 20, 22, 24 and 26 will occur along the thickness direction of the film 10.

Figure 6:
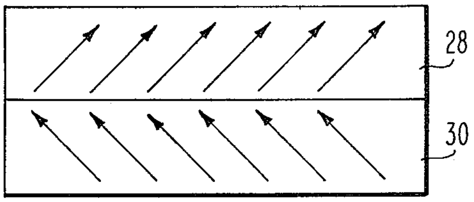
FIG. 6 is a cross-sectional view showing a plurality of layers having different angles of canting therein.

In FIG. 6, a layer of amorphous material 28 having the uniaxial magnetic anisotropy canted at a particular angle and direction and a layer 30 of amorphous material which has a canting in which the direction is in the opposite direction. A structure of this type could be useful in reducing the magnitude of the anisotropy of the resultant composite layer if the thickness of the individual layers are thinner than the domain wall thickness. Numerous variations may be employed. In addition, the layers 28 and 30 may have different regions within themselves which have different canting angles.

EXAMPLE I

A fused silica substrate 20 mils thick was cooled to −30°C and held at this temperature during the subsequent deposition step. Separate sources of holmium and cobalt were used with appropriate masks to evaporate these atoms at an angle of 30° from the perpendicular to the substrate. The pressure in the system during the evaporation step was between 1 to 5 × $10^{-7}$ torr. The evaporation was continued for 6 minutes to yield a layer 900A thick of $HoCo_2$. The canting of the anisotropy, $\phi$, in the layer was about 30°. The resultant direction of the magnetization of this layer was about 45°. The difference between this figure and the anisotropy due to canting, i.e., about 15°, was due to the demagnetization field, $4\pi M$.

EXAMPLE II

A fused silica substrate 20 mils thick was cooled to −30°C and held at this temperature during the subsequent deposition step. Separate sources of holmium and cobalt were used with appropriate masks to evaporate these atoms at an angle of 60° from the perpendicular to the substrate. The pressure in the system during the evaporation step was between 1 to 5 × $10^{-7}$ torr. The evaporation was continued for 6 minutes to yield a layer 900A thick of $HoCo_2$. The canting of the anisotropy, $\phi$, in the layer was about 60°. The resultant direction of the magnetization of this layer was about 70°. The difference between this figure and the anisotropy due to canting, i.e., about 10° was due to the demagnetization field, $4\pi M$.

Although several preferred embodiments of this invention have been described, it is understood that numerous other arrangements may be made in accordance with the principles of this invention.

We claim:

1. A film of magnetic amorphous material capable of supporting bubble domains comprising:

a region having a canted direction of magnetic uniaxial anisotropy, said canting direction defined by angles $\phi$ and $\theta$, where $0 < \phi < 90°$ and defines the angle of canting measured from the perpendicular to the plane of the film, and where $0 \leq \theta \leq 360°$ and defines the angle of orientation of the projection of the canting in the plane of the film as measured from an arbitrary line.

2. A film as described in claim 1 wherein $0 < \phi \leqq 10°$.

3. A film as described in claim 1 wherein $30° \leqq \phi < 90°$.

4. A film as described in claim 1 wherein at least one of said angles $\phi$ and $\theta$ is varying spatially.

5. A film of magnetic amorphous material capable of supporting bubble domains comprising:

a first region having a first canted direction of magnetic uniaxial anisotropy, said first canting direction defined by angles $\phi$, and $\theta$, where $0° < \phi < 90°$ and defines the angle of canting measured from the perpendicular to the plane of the film, and where $0° \leqq \theta \leqq 360°$ and defines the angle of orientation of the projection of the canting in the plane of the film as measured from an arbitrary line, and a second region having a second canted direction of magnetic uniaxial anisotropy, said second canting direction defined by angles $\phi_2$ and $\theta_2$, where $0° < \phi_2 < 90°$ and defines the angle of canting measured from the perpendicular to the plane of the film, and where $0° \leqq \theta_2 \leqq 360°$ and defines the angle of orientation of the projection of the canting in the plane of the film as measured from an arbitrary line.

6. A film as described in claim 5 wherein $\phi_1 \neq \phi_2$.

7. A film as described in claim 5 wherein $\theta_1 \neq \theta_2$.

8. A film of magnetic amorphous material capable of supporting bubble domains comprising:

a first layer having a first canted direction of magnetic uniaxial anisotropy, said first canting direction defined by angles $\phi_1$ and $\theta_1$, where $0° < \phi_1 < 90°$ and defines the angle of canting measured from the perpendicular to the plane of the film, and where $0° \leq \theta \leq 360°$ and defines the angle of orientation of the projection of the canting in the plane of the film as measured from an arbitrary line, and a second layer having a second canted direction of magnetic uniaxial anisotropy, said second canting direction defined by angles $\phi_2$ and $\theta_2$, where $0° < \phi_2 < 90°$ and defines the angle of canting measured from the perpendicular to the plane of the film, and where $0° \leq \theta_2 \leq 360°$ and defines the angle of orientation of the projection of the canting in the plane of the film as measured from an arbitrary line, said second layer being in contact with said first layer.

9. A film as described in claim 8 wherein $\phi_1 \neq \phi_2$.

10. A film as described in claim 8 wherein $\theta_1 \neq \theta_2$.

* * * * *